United States Patent [19]
Olschewski

[11] 3,782,875
[45] Jan. 1, 1974

[54] APPARATUS FOR THE CONTINUOUS MANUFACTURE OF CHIP BOARDS

[75] Inventor: Paul Olschewski, Springe/Deister, Germany

[73] Assignees: bison-werke Bahre; Greten GmbH and CoKG

[22] Filed: Jan. 4, 1972

[21] Appl. No.: 215,369

[30] Foreign Application Priority Data
Jan. 4, 1971 Germany................ P 21 00 132.1

[52] U.S. Cl.............. 425/223, 264/112, 425/367, 425/373, 425/307
[51] Int. Cl.................... B29j 5/02, B29j 5/04
[58] Field of Search................ 425/223, 224, 367, 425/373, 307; 264/112, 113

[56] References Cited
UNITED STATES PATENTS

| 3,212,137 | 10/1965 | Lemettre | 425/373 X |
| 2,761,803 | 9/1956 | Breitenbach | 156/260 |
| 2,442,443 | 6/1948 | Swallow | 425/373 |
| 3,039,137 | 6/1962 | Smith et al | 425/373 X |
| 2,266,263 | 12/1941 | Roiche | 425/224 X |
| 3,044,111 | 7/1962 | Caughey | 425/367 X |

Primary Examiner—Robert L. Spicer, Jr.
Attorney—Paul M. Craig, Jr. et al.

[57] ABSTRACT

An apparatus for continuously manufacturing chip boards and the like by pressing particles mixed with binders between a pressing roller and an endless steel or steel mesh belt by calibrating rollers. Two spaced rollers are provided for the belt to travel around, one of these rollers serving as the pressing roller. These two rollers are relatively large in diameter and are relatively widely spaced so that a large manufacturing space is obtained inside of the belt path between the rollers. A forming station for supplying particles and binders to the belt, as well as a cutting station for cutting the pressed boards, and a transporting station for transporting the finished and cut boards from the belt area, are situated within the manufacturing space between the rollers. Alternatively, a coiling station for coiling very thin finished lengths of board could be provided in the manufacturing space.

17 Claims, 4 Drawing Figures

APPARATUS FOR THE CONTINUOUS MANUFACTURE OF CHIP BOARDS

BACKGROUND OF THE INVENTION

The present invention relates to an apparatus for the continuous manufacture of boards, particularly chip boards formed from particles mixed with binders. It is particularly related to apparatus of the type having drivable endless tensionable steel or steel mesh belt guided over rollers which is covered with loose material and pressable by means of calibrating rolls against the periphery of a roller, wherein the particles mixed with binders are heated whilst being guided around one of the rolls. Apparatus of this general type is known ("Holz-Zentralblatt", 1970, no. 118, pp. 1,726 and 1,727).

In order to be able to compress and harden the chip cake consisting of particles mixed with binders and poured onto a steel belt, the belt is so guided around a relatively large diameter roller that the chip cake is pressed by calibrating rolls by way of the steel belt against the peripheral surface of the relatively large diameter roller. By heating the chip cake from the inside or the outside or in some other manner the compressed chip cake hardens before it leaves the relatively large diameter roller. In addition to the calibrating rolls necessary, a relatively large number of guide rollers are provided for guiding the steel belt. This type of installation is used for producing chip boards with a relatively limited thickness, for example, up to 6mm.

The present invention is directed to providing a simple construction press for producing relatively thin boards, particularly chip boards, where the length should be less than the length of the above-indicated known machines for producing relatively thin chip boards. The present invention is also directed to reducing the number of rollers needed for guiding the steel. The present invention is also directed to overcoming the disadvantages of prior arrangements as will be apparent from the following description.

SUMMARY OF THE INVENTION

According to the invention, the steel belt is guided around two parallel relatively large diameter rollers arranged in a horizontal plane and having a relatively large spacing from one another so as to form a relatively large manufacturing space inside the contours of the belt between the rollers. A pouring station is arranged in the manufacturing space surrounded by the steel belt and means are provided which lead away the compressed and heated product from the space surrounded by the steel belt. It is clear that, with this arrangement apart from the necessary calibrating rolls associated with one of the two rollers, only one further roller is necessary other than tension rollers which may additionally be provided in some cases in order to increase the tension of the steel belt guided around the rollers at particular points. Generally it suffices for the roller axis of one of the two relatively large diameter rollers to be fixed and for the roller axis of the other roller to be under the action of hydraulic devices which keeps the steel belt surrounding the rollers permanently under tension.

A further advantageous feature is the placement of the metering device and a forming station in the space surrounded by the steel belt. While several known forming stations could be placed in said space, the drawings and specification describe a preferred embodiment that can be used with this invention. However, many of the advantages of the present invention could be realized using other known forming stations within said space.

In instances when relatively thin boards are produced it is possible to wind a certain length of board web onto a reel and removing said reel and replacing it by another. However, in a preferred form of the present invention, it is recommended that in the area surrounded by the steel belt a transverse and/or longitudinal cutting apparatus be positioned from which can be laterally led away cut portions of the substantially endless board web which can be produced. Boards produced by cutting or separating can be led away in one direction or in opposite directions, this depending largely on the working rate of the machine. It must be ensured that the continuously produced board material is also continuously removed. Transverse and longitudinal cutting devices, as well as transportation and storage means for removal purposes can also preferably be positioned within the space delimited by the belt and the two large rollers, whereby the complete manufacturing process can be completed in an economical manner utilizing a minimum amount of space. Although many known cutting, transportation and storage means could be utilized in the present invention, the following detailed description refers to a preferred arrangement that is particularly advantageous in realizing the advantages of the present invention. The invention is hereinafter explained relative to schematically represented preferred embodiments.

DETAILED DESCRIPTION OF THE DRAWINGS

Figure 1:
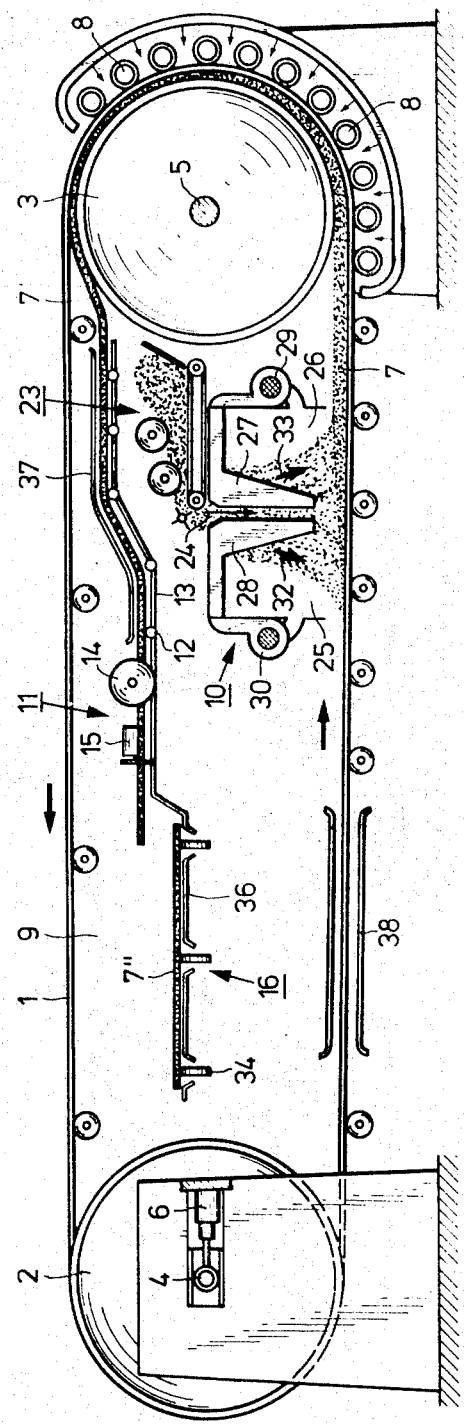
FIG. 1 is a side view of a chip board machine according to the invention.

As can be seen from FIG. 1 an endless steel belt 1 is guided around two rollers 2 and 3 whose axes of rotation 4 and 5 are relatively widely spaced. So as to be able to adjust the tension of the steel belt in the vicinity of the rollers 2 and 3, the roller 2 is under the action of one or more hydraulic devices 6.

If two, or more than two, hydraulic devices 6 are provided it is not only possible to adjust the pressure with which the steel belt 1 presses the chip cake guided between said steel belt 1 and the periphery of one of the two rollers against the periphery of said roller, but it is also possible to control the position of the steel belt relative to the rollers and thereby influence thickness differences of the chip cake over its width.

As the tension forces acting on the steel belt 1 would not alone necessarily suffice to exert the necessary pressure on the chip cake 7 in the peripheral area of roller 3, calibrating rolls 8 are associated with one drum 3. Since the details of operation of such calibrating rolls are known, a detailed description of these rolls 8 and their activation, is not included herein.

So that the chip cake 7 can also be hardened in the vicinity of the roller 3, heating devices are provided. For example, the roller 3 and the calibrating rolls can be made heatable, or the zone wherein the calibrating rolls act on the steel belt can be heated from the outside. Since the details of operation of such heating means are generally known, a further description is not included herein. However, FIG. 4, and the specification associated therewith discloses a heating arrangement for the intake area of the pressing roller. It is noted that the heating means should be operable to heat the chip material to temperatures between 200 and 250°C.

Figure 2:
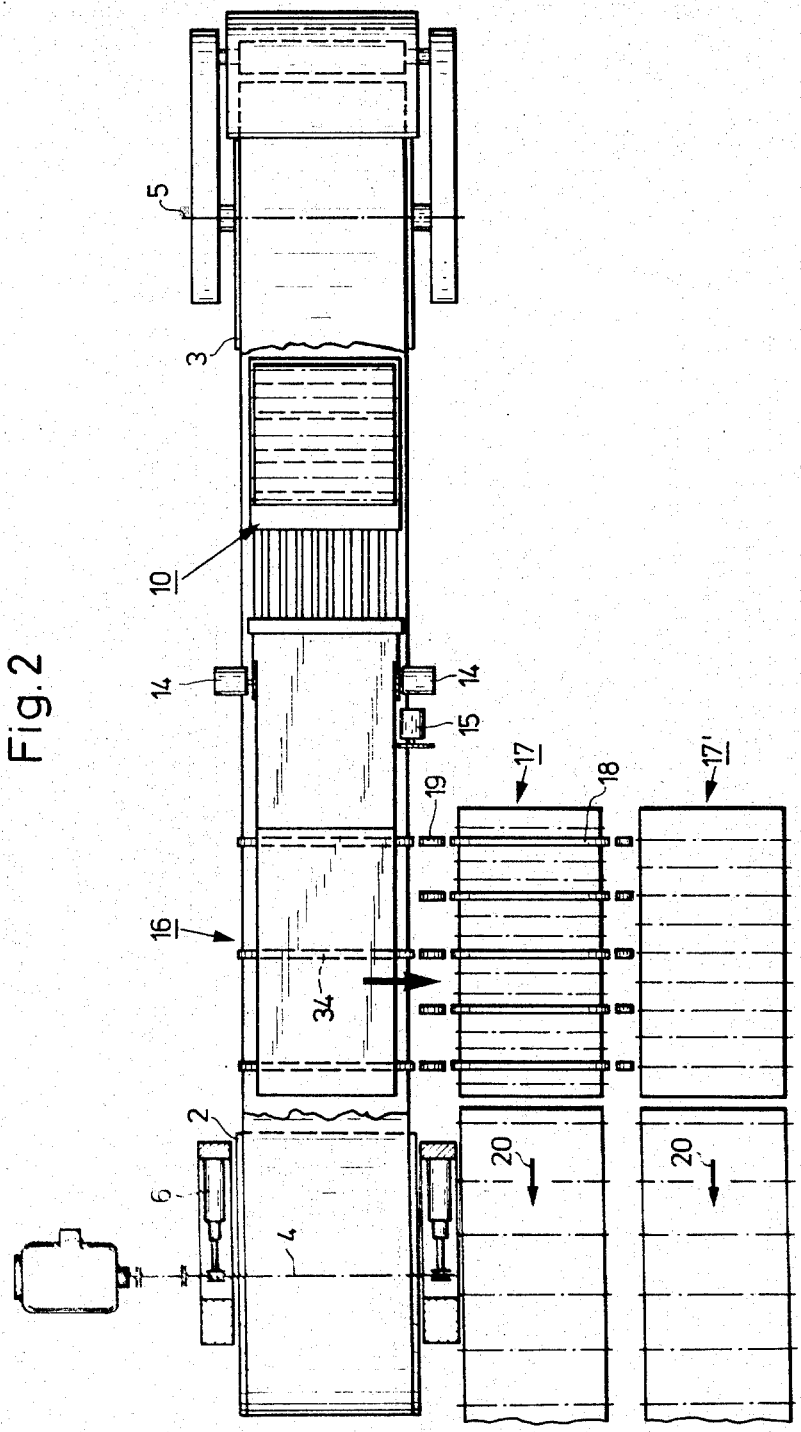
FIG. 2 is a plan view of FIG. 1, after partial removal of the upper portion of the steel belt surrounding the rollers.

As best seen from FIGS. 1 and 2, several manufacturing means are arranged in the relatively large manufacturing space 9 surrounded by the steel belt 1. This space 9 accomodates not only a forming station 10, but also a transverse and longitudinal cutting apparatus 11 so that the space 9 surrounded by the steel belt 1 is well utilized. The forming station 10 is located in the vicinity of the roller 3 serving for compressing and hardening the chip cake 7, whilst the transverse and longitudinal cutting apparatus is arranged in the space still remaining. The forming station 10 could be of the type disclosed in Austrian Pat. No. 243,496.

Figure 3:
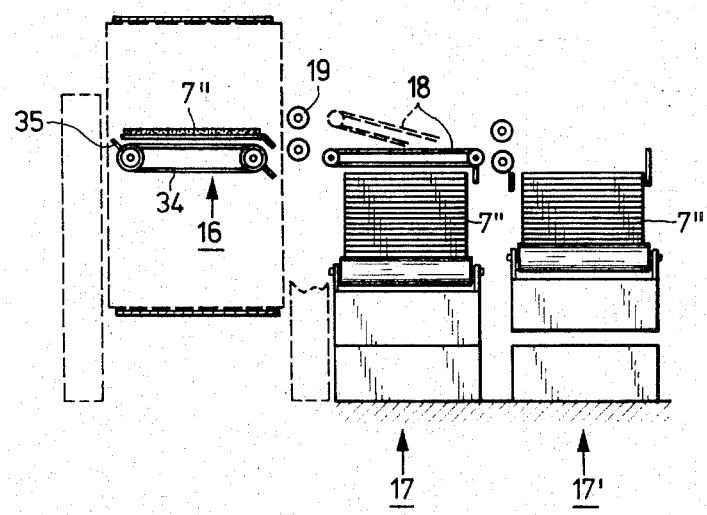
FIG. 3 is a front view of the machine according to FIGS. 1 and 2.

As can be seen from FIG. 1, the chip board 7' produced is guided over a table 13 provided with rollers 12 to a longitudinal cutting apparatus 14 behind which is arranged a transverse cutting apparatus 15 which cuts the board web 7' into individual boards 7''. The removal of one or several boards 7'' can be effected by transverse conveying means 16. The conveyor is shown only schematically since various known conveying means could be used with the present invention. For example, chains provided with carriers could be used. The boards falling onto the conveying means 16 are then transversely removed by transporting means 17. FIG. 3 shows that two transporting means 17 and 17' are provided and it is here assumed that on each of these two transporting means stacks comprising a plurality of individual boards can be removed together. If initially, transporting means 17 is loaded with boards 7'' then a pivotally mounted conveyor belt 18 or the like, as shown by the dotted lines, is tilted up into the intake zone so that one or more boards 7'' can be guided between a pair of rollers 19 and stacked on the transporting means. When such a stack has reached a sufficient height it is removed in the direction of the arrow 20. By lowering the conveyor belt 18 it is possible to then supply boards to the transporting means 17' so that no interruption of the removal process has to be taken into account.

Figure 4:
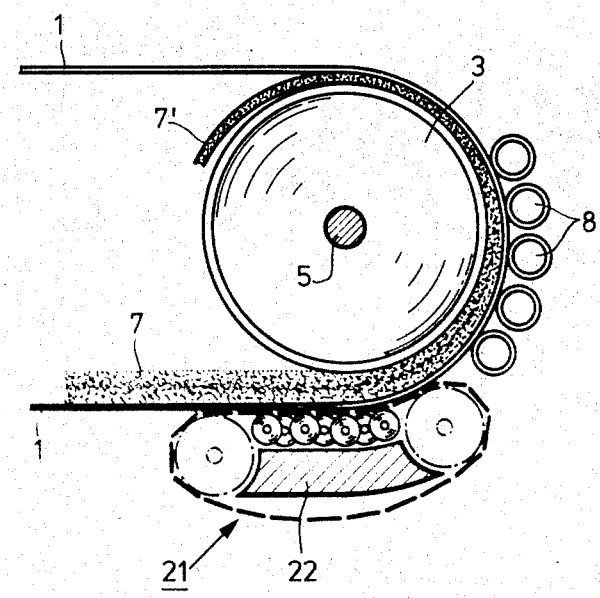
FIG. 4 is a partial side view of the roller in the vicinity of which the compression and hardening of the chip cake takes place.

FIG. 4 shows that in the intake zone of the chip cake 7 below roller 3, a means 21 is provided for pressing the chip material 7 over the steel belt 1. This means 21 substantially comprises an appropriate heatable core 22 around which is placed a supporting endless chain which advantageously comprises plate-like chain members. The bearing surface of said means 21 on steel belt 1 can be planar or concave namely when viewed from the side.

In the embodiment shown, the forming station 10 comprises a metering station 23 which feeds the chips or the like treated with binders, in the direction of the arrow 24 to two strewing chambers 25 and 26. Between these two strewing chambers are arranged two groups of air registers 27 and 28 via which the air produced by blowers 29 and 30 is blown out in the direction of arrows 32 and 33 so that the chip material or the like is scattered onto the steel belt 1 according to the wind separation principle so that the smallest particles serve to form the covering layer.

Various specific designs of the transverse and/or longitudinal cutting devices as well as the transverse conveying and transporting means can be used with the present invention. A preferred form of transverse transporting means 16 shown in the drawings can comprise a plurality of chains or belts 34 having in each case two carriers 35. Between each pair of chains or the like 34 and also laterally of the outermost chain or the like bearing surfaces 36 are provided for the boards 7''. The plane formed by these bearing surfaces is somewhat higher than the upper run of the chains or the like because the transverse movement of one or more boards 7'' is brought about by carriers 35 projecting above the bearing surface.

Although the machine according to the invention is mainly intended for the production of wood chip or wood fibre boards it can also be used to produce other boards of particles provided with binders, e.g., boards made from bagasse, flax or the like.

As the apparatus according to the invention can operate with a relatively high output rate it is recommended for the steel belt 1 and/or the board material 7' between rollers 3 and 2 to be placed in a coolable channel 37. However, the steel belt can also be coolable where it does not serve for guiding the loose material or board material as indicated by channel 38. The boards should be uniformly cooled on both sides for optimum forming results.

Consequently, while I have shown and described one embodiment of the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

What is claimed:

1. Apparatus for the continuous manufacture of boards, particularly chip boards made from loose particles mixed with binders; said apparatus comprising: a drivable endless tensionable belt, first and second relatively large diameter rollers for guiding the belt in a path around said rollers, said first and second rollers being spaced from one another such that a manufacturing space is formed between the first and second rollers inside of the path of the belt and delimited by said belt, a pouring station arranged in said manufacturing space for supplying loose particles and binders to the belt on the side facing said manufacturing space, calibrating rolls for pressing the belt against the loose particles and binders as the belt passes over around said first roller, and heating means for heating the loose particles and binders as they are being pressed between the belt and said first roller.

2. Apparatus according to claim 1, characterized in that a metering station is provided within said manufacturing space in a position adjacent said pouring station for metering the supply of loose particles and binders supplied to the belt.

3. Apparatus according to claim 1, characterized in that a cutting apparatus is arranged in said manufacturing space for cutting the compressed board material as it is removed from the belt and first roller.

4. Apparatus according to claim 3, characterized in that said cutting apparatus includes transverse cutting means for cutting transversely through the board material to form boards of predetermined length.

5. Apparatus according to claim 3, characterized in that said cutting apparatus includes longitudinal cutting means for cutting longitudinally through the board material to form boards of predetermined width.

6. Apparatus according to claim 4, characterized in that said cutting apparatus includes longitudinal cutting means for cutting longitudinally through the board material to form boards of predetermined width.

7. Apparatus according to claim 2, characterized in that a cutting apparatus is arranged in said manufacturing space for cutting the compressed board material as it is removed from the belt and first roller.

8. Apparatus according to claim 4, characterized in that transverse transporting means are arranged in said manufacturing space for laterally removing the cut boards.

9. Apparatus according to claim 7, characterized in that transverse transporting means are arranged in said manufacturing space for laterally removing the cut boards.

10. Apparatus according to claim 8, characterized in that the transverse transporting means includes means for removing cut boards falling thereon in opposite directions.

11. Apparatus according to claim 9, characterized in that the transverse transporting means includes means for removing cut boards falling thereon in opposite directions.

12. Apparatus according to claim 1, characterized in that said belt is guided in at least one coolable channel.

13. Apparatus according to claim 12, characterized in that said belt is guided in two coolable channels, one channel being disposed remote from that portion of the belt path where the belt is in contact with the board material, the other channel being disposed to cool both the board material and the belt.

14. Apparatus according to claim 13, characterized in that said other channel is positioned within said manufacturing space.

15. Apparatus according to claim 8, characterized in that said belt is guided in two coolable channels, one channel being disposed remote from that portion of the belt path where the belt is in contact with the board material, the other channel being disposed to cool both the board material and the belt.

16. Apparatus according to claim 1, characterized in that said belt is constructed of steel mesh.

17. Apparatus according to claim 1, characterized in that said second roller is adjustable for varying the tension in the belt.

* * * * *